(12) United States Patent
Kontomaris et al.

(10) Patent No.: US 8,765,004 B2
(45) Date of Patent: Jul. 1, 2014

(54) COMPOSITION COMPRISING 2,3,3,3-TETRAFLUOROPROPENE AND 1,1,1,2-TETRAFLUOROETHANE, CHILLERS CONTAINING SAME AND METHODS OF PRODUCING COOLING THEREIN

(75) Inventors: Konstantinos Kontomaris, Wilmington, DE (US); Thomas Joseph Leck, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/640,650

(22) PCT Filed: Apr. 12, 2011

(86) PCT No.: PCT/US2011/032072
§ 371 (c)(1),
(2), (4) Date: Oct. 11, 2012

(87) PCT Pub. No.: WO2011/130237
PCT Pub. Date: Oct. 20, 2011

(65) Prior Publication Data
US 2013/0025299 A1    Jan. 31, 2013

Related U.S. Application Data

(60) Provisional application No. 61/324,984, filed on Apr. 16, 2010.

(51) Int. Cl.
*C09K 5/04* (2006.01)
*F25B 11/04* (2006.01)

(52) U.S. Cl.
USPC .................................. 252/67; 252/68; 62/115

(58) Field of Classification Search
CPC ............. F25B 1/04; F25B 1/00; C09K 5/045; C09K 2205/22
USPC ......................................... 252/67, 68; 62/115
See application file for complete search history.

(56) References Cited

U.S. PATENT DOCUMENTS

| | | | |
|---|---|---|---|
| 6,252,099 B1 | 6/2001 | Subramanian | |
| 8,148,317 B2 | 4/2012 | Singh et al. | |
| 8,246,850 B2 * | 8/2012 | Rached | 252/67 |
| 8,252,198 B2 * | 8/2012 | Rached | 252/67 |
| 2005/0247905 A1 | 11/2005 | Singh et al. | |
| 2006/0243944 A1 | 11/2006 | Minor et al. | |
| 2007/0007488 A1 | 1/2007 | Singh et al. | |
| 2007/0069175 A1 * | 3/2007 | Thomas et al. | 252/68 |
| 2007/0179324 A1 | 8/2007 | Van Der Puy et al. | |
| 2008/0230738 A1 * | 9/2008 | Minor et al. | 252/67 |
| 2008/0314073 A1 * | 12/2008 | Minor | 62/498 |
| 2009/0120619 A1 * | 5/2009 | Sievert et al. | 165/104.27 |
| 2009/0267019 A1 * | 10/2009 | Yana Motta et al. | 252/68 |
| 2010/0047189 A1 | 2/2010 | Seeton et al. | |
| 2010/0186432 A1 * | 7/2010 | Perti et al. | 62/115 |
| 2010/0319377 A1 * | 12/2010 | Moriwaki et al. | 62/238.6 |
| 2011/0108757 A1 | 5/2011 | Shibanuma et al. | |
| 2012/0153213 A1 * | 6/2012 | Rached | 252/67 |
| 2012/0159982 A1 * | 6/2012 | Rached | 62/468 |
| 2012/0167615 A1 * | 7/2012 | Rached | 62/468 |
| 2012/0255316 A1 | 10/2012 | Andre et al. | |
| 2013/0055733 A1 * | 3/2013 | Rached | 62/77 |
| 2013/0055738 A1 * | 3/2013 | Rached | 62/114 |
| 2013/0061613 A1 | 3/2013 | Rached | |
| 2013/0096218 A1 * | 4/2013 | Rached et al. | 521/170 |

FOREIGN PATENT DOCUMENTS

| | | |
|---|---|---|
| WO | 2009/018117 A1 | 2/2009 |
| WO | 2010/002020 A1 | 1/2010 |
| WO | 2011023923 A1 | 3/2011 |
| WO | 2011140289 A2 | 11/2011 |

OTHER PUBLICATIONS

The Scientific Assessment of Ozone Depletion, 2002, A report of the World Meteorological Association's Global Ozone Research and Monitoring Project, section 1.4.4, pp. 1.28 to 1.3.

Doherty, M. F. and Malone, M. F., Conceptual Design of Distillation Systems, 2001, Chapter 5, pp. 185-186, Chapter 8, pp. 351-359, McGraw-Hill (New York).

Calm, James M. and Hourahan, Glenn C., Refrigerant Data Update, Heating/Piping/Air Conditioning Engineering, 79(1):50-64, Jan. 2007.

PCT International Search Report and Written Opinion mailed Jul. 13, 2011.

* cited by examiner

*Primary Examiner* — Douglas McGinty (57) ABSTRACT

Disclosed herein is a chiller apparatus containing a composition comprising from about 6 to about 70 weight percent 2,3,3,3-tetrafluoropropene and from about 30 to about 94 weight percent 1,1,1,2-tetrafluoroethane. Also disclosed herein is a method for producing cooling in a chiller comprising (a) evaporating a liquid refrigerant comprising from about 6 to 70 weight percent 2,3,3,3-tetrafluoropropene and from about 30 to 94 weight percent 1,1,1,2-tetrafluoroethane in an evaporator having a heat transfer medium passing therethrough thereby producing a vapor refrigerant; and (b) compressing the vapor refrigerant in a compressor. Also disclosed herein is a method for replacing a refrigerant in a chiller designed for using HFC-134a or CFC-12 as refrigerant, comprising charging said chiller with a composition comprising a refrigerant consisting essentially of from about 6 to 70 weight percent 2,3,3,3-tetrafluoropropene and from about 30 to 94 weight percent 1,1,1,2-tetrafluoroethane.

15 Claims, 3 Drawing Sheets

COMPOSITION COMPRISING 2,3,3,3-TETRAFLUOROPROPENE AND 1,1,1,2-TETRAFLUOROETHANE, CHILLERS CONTAINING SAME AND METHODS OF PRODUCING COOLING THEREIN

This application represents a national filing under 35 U.S.C. 371 of International Application No. PCT/US11/32072, filed Apr. 12, 2011, and claims priority benefit of U.S. Provisional Application No. 61/324,984, filed Apr. 16, 2010.

BACKGROUND OF THE INVENTION

1. Field of the Invention

The present disclosure relates to the field of refrigerants for use in air conditioning or refrigeration equipment. In particular, the present disclosure relates to refrigerants for use in chillers (especially centrifugal chillers) and compositions used therein.

2. Description of Related Art

Working fluids for various applications are being sought that have lower environmental impact than currently used working fluids. The hydrochlorofluorocarbon (HCFC) and hydrofluorocarbon (HFC) working fluids adopted as replacements for chlorofluorocarbon (CFC) working fluids, have lower or no ozone depletion potential (ODP), but have raised concerns as to their contribution to global warming. Additionally, the HCFCs will finally reach the phase out deadline set by the Montreal Protocol due to ODP. With regulations coming in force soon based on global warming potential, even the HFCs, with zero ODP will not be environmentally acceptable working fluids.

Therefore, replacements are sought for the CFCs, HCFCs, and HFCs currently in use as refrigerants, heat transfer fluids, cleaning solvents, aerosol propellants, foam blowing agents and fire extinguishing or suppression agents.

In order to serve as drop-in replacements of working fluids in existing equipment, replacement working fluids must have properties that closely match the properties of the original working fluids for which the equipment was designed. It would be desirable to identify compositions that provide a balance of properties that will allow replacement of existing refrigerants and also to serve as refrigerants in new equipment designed for similar applications.

In searching for a replacement for 1,1,1,2-tetrafluoroethane (HFC-134a) and difluorotrichloromethane (CFC-12) in particular in chiller applications, it would be desirable to consider compositions comprising unsaturated fluorocarbons. The unsaturated fluorocarbons have zero ODP and significantly lower GWP than the refrigerants in use today.

SUMMARY OF THE INVENTION

It has been found that compositions comprising from about 6 to about 82 weight percent 2,3,3,3-tetrafluoropropene (e.g., from about 38 to about 82 weight percent 2,3,3,3-tetrafluoropropene) and from about 94 to about 18 weight percent 1,1,1,2-tetrafluoroethane (e.g., from about 62 to about 18 weight percent 1,1,1,2-tetrafluoroethane) when used as working fluids in chillers enable high energy efficiency and cooling capacity while having low GWP and low ODP values. Of particular note are embodiments of these compositions that are azeotropic and azeotrope-like compositions; and embodiments of these compositions that are non-flammable.

This invention provides a chiller apparatus containing a composition comprising from about 6 to about 70 weight percent 2,3,3,3-tetrafluoropropene and from about 30 to about 94 weight percent 1,1,1,2-tetrafluoroethane.

This invention further provides compositions comprising from about 51 to about 67 weight percent 2,3,3,3-tetrafluoropropene and from about 49 to about 33 weight percent 1,1,1,2-tetrafluoroethane.

This invention further provides compositions comprising from about 58.0 to about 59.5 weight percent 2,3,3,3-tetrafluoropropene and from about 42.0 to about 40.5 weight percent 1,1,1,2-tetrafluoroethane. This invention further provides compositions comprising from about 54.0 to about 56.0 weight percent 2,3,3,3-tetrafluoropropene and from about 46.0 to about 44.0 weight percent 1,1,1,2-tetrafluoroethane.

This invention further provides compositions comprising a refrigerant consisting essentially of from about 51 to about 67 weight percent 2,3,3,3-tetrafluoropropene and from about 49 to about 33 weight percent 1,1,1,2-tetrafluoroethane.

This invention further provides compositions comprising a refrigerant consisting essentially of from about 58.0 to about 59.5 weight percent 2,3,3,3-tetrafluoropropene and from about 42.0 to about 40.5 weight percent 1,1,1,2-tetrafluoroethane.

This invention further provides composition comprising a refrigerant consisting essentially of from about 54.0 to about 56.0 weight percent 2,3,3,3-tetrafluoropropene and from about 46.0 to about 44.0 weight percent 1,1,1,2-tetrafluoroethane.

This invention further provides a method for producing cooling in a chiller comprising (a) evaporating a liquid refrigerant comprising from about 6 to about 70 weight percent 2,3,3,3-tetrafluoropropene and from about 30 to about 94 weight percent 1,1,1,2-tetrafluoroethane in an evaporator having a heat transfer medium passing therethrough thereby producing a vapor refrigerant; and (b) compressing the vapor refrigerant in a centrifugal compressor, wherein the volumetric cooling capacity of the refrigerant is greater than the individual volumetric cooling capacities of 2,3,3,3-tetrafluoropropene alone and 1,1,1,2-tetrafluoroethane alone.

This invention further provides a method for replacing a refrigerant in a chiller designed for using HFC-134a or CFC-12 as refrigerant, comprising charging said chiller with a composition comprising a refrigerant consisting essentially of from about 6 to about 70 weight percent 2,3,3,3-tetrafluoropropene and from about 30 to about 94 weight percent 1,1,1,2-tetrafluoroethane thereby increasing the cooling capacity of the chiller.

DETAILED DESCRIPTION OF THE PREFERRED EMBODIMENTS

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant in an evaporator per unit mass of refrigerant circulated. Volumetric cooling capacity refers to the amount of heat removed by the refrigerant in the evaporator per unit volume of refrigerant vapor exiting the evaporator. The refrigeration capacity is a measure of the ability of a refrigerant or heat transfer composition to produce cooling. Cooling rate refers to the heat removed by the refrigerant in the evaporator per unit time.

Coefficient of performance (COP) is the amount of heat removed in the evaporator divided by the required energy input to operate the cycle. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer medium comprises a composition used to carry heat from a body to be cooled to the chiller evaporator or from the chiller condenser to a cooling tower or other configuration where heat can be rejected to the ambient.

As used herein, a refrigerant comprises a compound or mixture of compounds that function to transfer heat in a cycle wherein the composition undergoes a phase change from a liquid to a gas and back to a liquid in a repeating cycle.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681-2001. The upper flammability limit ("UFL") is the maximum concentration of the heat transfer composition in air that is capable of propagating a flame through a homogeneous mixture of the composition and air as determined by ASTM E-681. The LFL and UFL of a mixture comprising a flammable component and a non-flammable component approach each other as the proportion of the non-flammable component in the mixture increases and eventually coincide at some limiting proportion of the non-flammable component. Compositions containing more non-flammable component than the limiting proportion will be non-flammable. For a single component refrigerant or an azeotropic refrigerant blend, the composition will not change during a leak and therefore composition change during leaks will not be a factor in determining flammability. For many refrigeration and air conditioning applications, the refrigerant or working fluid is required to be non-flammable.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (See, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is recognized that both the boiling point and the weight percentages of each component of the azeotropic composition may change when the azeotropic composition is subjected to boiling at different pressures. Thus, an azeotropic composition may be defined in terms of the weight percentages of each component of the composition characterized by a fixed boiling temperature at a specified pressure.

As used herein, an azeotrope-like composition means a composition that behaves essentially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit virtually equal dew point and bubble point pressures. That is to say that the difference in the dew point pressure and bubble point pressure at a given temperature will be small. Compositions described herein with dew point and bubble pressures differing by 5% or less (based upon the bubble point pressure) are considered to be azeotrope-like. Of particular note are compositions that exhibit a difference in dew point pressure and bubble point pressure of 0.01% or less.

A non-azeotropic composition or a non-azeotrope-like composition is a mixture of two or more substances that upon partial evaporation or distillation from a liquid state produces a vapor that has a substantially different composition from the liquid from which it was evaporated or distilled. Another way to characterize a non-azeotropic composition is that the bubble point vapor pressure and the dew point vapor pressure of the composition at a particular temperature are substantially different. Herein, a composition is non-azeotropic if the difference in dew point pressure and bubble point pressure is greater than 5 percent (based upon the bubble point pressure).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions 2,3,3,3-tetrafluoropropene, also known as HFO-1234yf, may be made by methods known in the art, such as described in U.S. Pat. No. 6,252,099, by reaction of propylene with silver fluoride or in U.S. Patent Application Publication No. 2007-0179324 A1 by dehydrofluorination of 1,1,1,2,3-pentafluoropropane (HFC-245eb).

1,1,1,2-tetrafluoroethane (also known as HFC-134a or R-134a) is available commercially from many refrigerant producers and distributors.

In one embodiment, compositions for use in chillers comprise HFO-1234yf and HFC-134a. In some embodiments, the compositions disclosed herein comprising 2,3,3,3-tetrafluoropropene and 1,1,1,2-tetrafluoroethane that are useful in chillers, either flooded evaporator or direct expansion chillers, are azeotropic or azeotrope-like. In one embodiment, azeotropic and azeotrope-like compositions are particularly useful in flooded evaporator chillers because the performance of flooded evaporated chillers deteriorates when refrigerant compositions that fractionate are used. Refrigerant mixtures that are not azeotropic or azeotrope-like fractionate to some degree while in use in a chiller. It is often difficult to identify single component refrigerants that reasonably match the properties of existing refrigerants and thus can serve as reasonable replacements for existing refrigerants. Therefore, compositions that are azeotropic or azeotrope-like and have properties that match the properties of currently used refrigerants are particularly advantageous.

It has been found that compositions comprising from about 6 to about 82 weight percent 2,3,3,3-tetrafluoropropene (e.g., from about 38 to about 82 weight percent 2,3,3,3-tetrafluoropropene) and from about 94 to about 18 weight percent 1,1,1,2-tetrafluoroethane (e.g., from about 62 to about 18 weight percent 1,1,1,2-tetrafluoroethane) when used as working fluids in chillers enable high energy efficiency and cooling capacity while having low GWP and low ODP values.

In one embodiment, the azeotropic or azeotrope-like compositions comprise from about 38 to about 82 weight percent 2,3,3,3-tetrafluoropropene and from about 62 to about 18 weight percent 1,1,1,2-tetrafluoroethane. These azeotropic and azeotrope-like compositions encompass the compositions comprising 2,3,3,3-tetrafluoropropene and 1,1,1,2-tetrafluoroethane with minimum difference between bubble point vapor pressure and dew point vapor pressure and therefore minimum glide from a temperature of about 0° C. to about 40° C. (the approximate practical working temperature range of chillers). Therefore, these compositions allow optimum performance of both the evaporator and the condenser of a chiller.

In another embodiment, the compositions for use in a chiller apparatus comprises from about 6 to about 70 weight percent 2,3,3,3-tetrafluoropropene and from about 30 to about 94 weight percent 1,1,1,2-tetrafluoroethane. It has been surprisingly determined that compositions in this range have volumetric cooling capacity greater than the individual volumetric cooling capacities of both 2,3,3,3-tetrafluoropropene and 1,1,1,2-tetrafluoroethane alone under typical chiller operation conditions.

In another embodiment, the compositions as disclosed herein that allow optimization of the condenser conditions for a chiller comprise from about 38 to about 67 weight percent 2,3,3,3-tetrafluoropropene and from about 62 to about 33 weight percent 1,1,1,2-tetrafluoroethane. These compositions allow minimal fractionation in the condenser with an approximate temperature of 40° C.

In another embodiment, the compositions as disclosed herein that allow optimization of the evaporator conditions for a chiller comprise from about 54 to about 82 weight percent 2,3,3,3-tetrafluoropropene and from about 46 to about 18 weight percent 1,1,1,2-tetrafluoroethane. These compositions allow minimal fractionation in the evaporator with an approximate temperature of 0° C.

In another embodiment, the compositions as disclosed herein that will provide minimum glide in both the evaporator and condenser of a chiller are those compositions that are azeotropes. Therefore, in said embodiment, the compositions comprise from about 51 to about 67 weight percent 2,3,3,3-tetrafluoropropene and from about 49 to about 33 weight percent 1,1,1,2-tetrafluoroethane, which are azeotropic between 0 and 40° C.

In another embodiment, the compositions as disclosed herein that allow optimization of the evaporator conditions for a chiller comprise from about 54 to about 67 weight percent 2,3,3,3-tetrafluoropropene and from about 46 to about 33 weight percent 1,1,1,2-tetrafluoroethane.

In another embodiment, the compositions as disclosed herein comprise from about 54 to about 56 weight percent 2,3,3,3-tetrafluoropropene and from about 46 to about 44 weight percent 1,1,1,2-tetrafluoroethane. Of particular note is a composition comprising about 55 weight percent 2,3,3,3-tetrafluoropropene and about 45 weight percent 1,1,1,2-tetrafluoroethane.

It is desirable to have refrigerants that are non-flammable in some applications. In some embodiments, the compositions disclosed herein comprising 2,3,3,3-tetrafluoropropene and 1,1,1,2-tetrafluoroethane are non-flammable. In one embodiment, the compositions comprising 2,3,3,3-tetrafluoropropene and 1,1,1,2-tetrafluoroethane useful in chillers are non-flammable compositions comprising greater than or equal to about 41 weight percent 1,1,1,2-tetrafluoroethane Of particular note are embodiments that are both azeotropic or azeotrope-like and non-flammable, such as compositions comprising from about 58.0 to about 59.5 weight percent 2,3,3,3-tetrafluoropropene and from about 42.0 to about 40.5 weight percent 1,1,1,2-tetrafluoroethane. One embodiment of the compositions as disclosed herein that is azeotropic or azeotrope like and nonflammable is a composition comprising about 59 weight percent 2,3,3,3-tetrafluoropropene and about 41 weight percent 1,1,1,2-tetrafluoroethane.

Another embodiment of the compositions as disclosed herein that is azeotropic or azeotrope like and nonflammable is a composition comprising about 53 weight percent 2,3,3,3-tetrafluoropropene and about 47 weight percent 1,1,1,2-tetrafluoroethane. Further, are additional compositions comprising a refrigerant consisting essentially of from about 58.0 to about 59.5 weight percent 2,3,3,3-tetrafluoropropene and from about 42.0 to about 40.5 weight percent 1,1,1,2-tetrafluoroethane. Of particular note is one embodiment comprising a refrigerant consisting essentially of about 59 weight percent 2,3,3,3-tetrafluoropropene and about 41 weight percent 1,1,1,2-tetrafluoroethane.

Also of note are compositions comprising a refrigerant consisting essentially of from about 54.0 to about 56.0 weight percent 2,3,3,3-tetrafluoropropene and from about 46.0 to about 44.0 weight percent 1,1,1,2-tetrafluoroethane. Of particular note is one composition comprising a refrigerant consisting essentially of about 55 weight percent 2,3,3,3-tetrafluoropropene and about 45 weight percent 1,1,1,2-tetrafluoroethane.

And in another embodiment is a composition comprising a refrigerant consisting essentially of about 53 weight percent 2,3,3,3-tetrafluoropropene and about 47 weight percent 1,1,1,2-tetrafluoroethane.

In one embodiment, the compositions as disclosed herein comprising 2,3,3,3-tetrafluoropropene and 1,1,1,2-tetrafluoroethane may be used in combination with a desiccant in a chiller to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.).

In one embodiment, the compositions as disclosed herein comprising 2,3,3,3-tetrafluoropropene and 1,1,1,2-tetrafluoroethane as disclosed herein may be used in combination with at least one lubricant selected from the group consisting of polyalkylene glycols, polyol esters, polyvinylethers, mineral oils, alkylbenzenes, synthetic paraffins, synthetic naphthenes, and poly(alpha)olefins.

In some embodiments, lubricants useful in combination with the compositions as disclosed herein may comprise those suitable for use with chiller apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In other embodiments, lubricants may also comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs). Preferred lubricants are polyol esters.

Lubricants used with the refrigerants disclosed herein are selected by considering a given compressor's requirements and the environment to which the lubricant will be exposed.

In one embodiment, the refrigerants as disclosed herein may further comprise an additive selected from the group consisting of compatibilizers, UV dyes, solubilizing agents, tracers, stabilizers, perfluoropolyethers (PFPE), and functionalized perfluoropolyethers.

In one embodiment, the compositions may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration or air-conditioning system additives may be added, as desired, to the in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated friaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates.

Apparatus

In one embodiment is provided a chiller apparatus containing a composition comprising from about 6 to 70 weight percent 2,3,3,3-tetrafluoropropene and from about 30 to 94 weight percent 1,1,1,2-tetrafluoroethane. A chiller apparatus can be of various types including centrifugal apparatus and positive displacement apparatus. Chiller apparatus typically includes an evaporator, compressor, condenser and a pressure reduction device, such as a valve. Compositions comprising from about 6 to 70 weight percent 2,3,3,3-tetrafluoropropene and from about 30 to 94 weight percent 1,1,1,2-tetrafluoroethane provide volumetric cooling capacities higher than the volumetric cooling capacities of either pure 1,1,1,2-tetrafluoroethane or pure 2,3,3,3-tetrafluoropropene alone.

In another embodiment is provided a chiller apparatus containing a composition comprising from about 38 to 82 weight percent 2,3,3,3-tetrafluoropropene and from about 62 to 18 weight percent 1,1,1,2-tetrafluoroethane.

Figure 1:
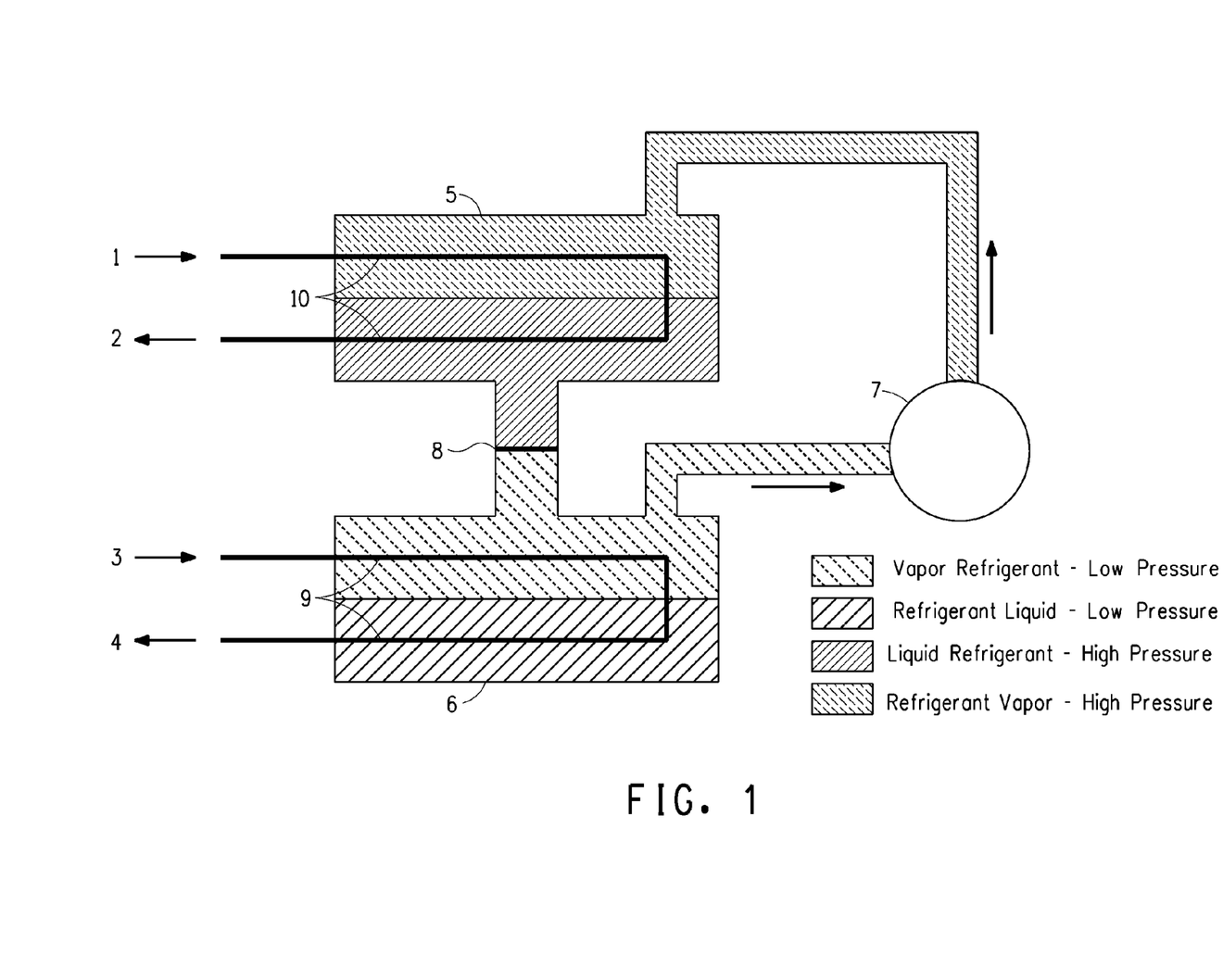
FIG. 1 is a schematic diagram of one embodiment of a centrifugal chiller having a flooded evaporator, which utilizes a composition described herein comprising 2,3,3,3-tetrafluoropropene and 1,1,1,2-tetrafluoroethane.
Figure 2:
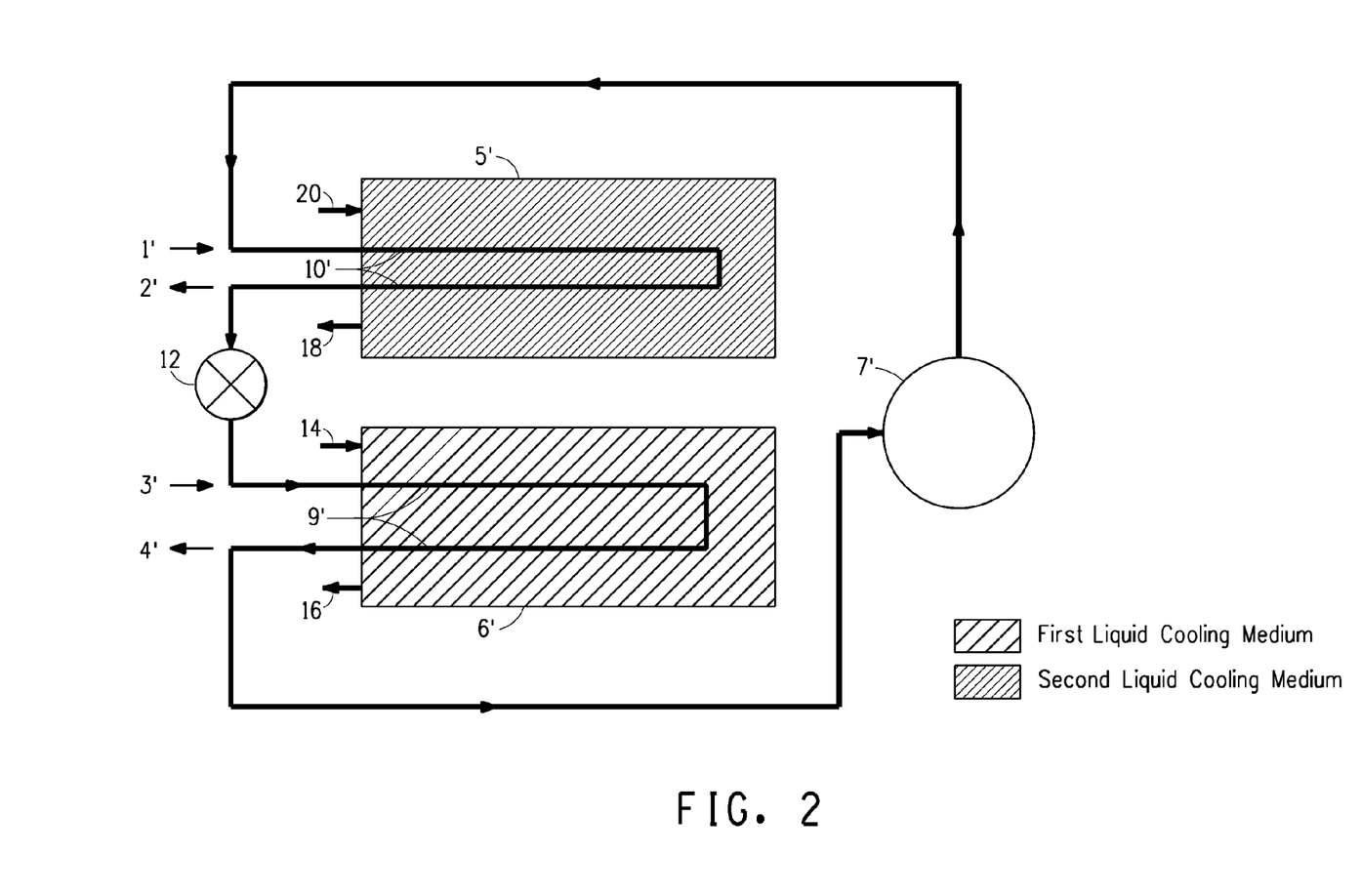
FIG. 2 is a schematic diagram of one embodiment of a centrifugal chiller having a direct expansion evaporator, which utilizes a composition described herein comprising 2,3,3,3-tetrafluoropropene and 1,1,1,2-tetrafluoroethane.

A chiller is a type of air conditioning/refrigeration apparatus. The present disclosure is directed to a vapor compression chiller. Such vapor compression chillers may be either flooded evaporator chillers, one embodiment of which is shown in FIG. 1, or direct expansion chillers, one embodiment of which is shown in FIG. 2. Both a flooded evaporator chiller and a direct expansion chiller may be air-cooled or water-cooled. In the embodiment where chillers are water cooled, such chillers are generally associated with cooling towers for heat rejection from the system. In the embodiment where chillers are air-cooled, the chillers are equipped with refrigerant-to-air finned-tube condenser coils and fans to reject heat from the system. Air-cooled chiller systems are generally less costly than equivalent-capacity water-cooled chiller systems including cooling tower and water pump. However, water-cooled systems can be more efficient under many operating conditions due to lower condensing temperatures.

Chillers, including both flooded evaporator and direct expansion chillers, may be coupled with an air handling and distribution system to provide comfort air conditioning (cooling and dehumidifying the air) to large commercial buildings, including hotels, office buildings, hospitals, universities and the like. In another embodiment, chillers, most likely air-cooled direct expansion chillers, have found additional utility in naval submarines and surface vessels.

To illustrate how chillers operate, reference is made to the Figures. A water-cooled, flooded evaporator chiller is shown illustrated in FIG. 1. In this chiller a first heat transfer medium, which is a warm liquid, which comprises water, and, in some embodiments, additives, such as a glycol (e.g., ethylene glycol or propylene glycol), enters the chiller from a cooling system, such as a building cooling system, shown entering at arrow 3, through a coil or tube bundle 9, in an evaporator 6, which has an inlet and an outlet. The warm first heat transfer medium is delivered to the evaporator, where it is cooled by liquid refrigerant, which is shown in the lower portion of the evaporator. The liquid refrigerant evaporates at a temperature lower than the temperature of the warm first heat transfer medium which flows through coil 9. The cooled first heat transfer medium re-circulates back to the building cooling system, as shown by arrow 4, via a return portion of coil 9. The liquid refrigerant, shown in the lower portion of evaporator 6 in FIG. 1, vaporizes and is drawn into a compressor 7, which increases the pressure and temperature of the refrigerant vapor. The compressor compresses this vapor so that it may be condensed in a condenser 5 at a higher pressure and temperature than the pressure and temperature of the refrigerant vapor when it comes out of the evaporator. A second heat transfer medium, which is a liquid in the case of a water-cooled chiller, enters the condenser via a coil or tube bundle 10 in condenser 5 from a cooling tower at arrow 1 in FIG. 1. The second heat transfer medium is warmed in the process and returned via a return loop of coil 10 and arrow 2 to a cooling tower or to the environment. This second heat transfer medium cools the vapor in the condenser and causes the vapor to condense to liquid refrigerant, so that there is liquid refrigerant in the lower portion of the condenser as shown in FIG. 1. The condensed liquid refrigerant in the condenser flows back to the evaporator through an expansion device 8, which may be an orifice, capillary tube or expansion valve. Expansion device 8 reduces the pressure of the liquid refrigerant, and converts the liquid refrigerant partially to vapor, that is to say that the liquid refrigerant flashes as pressure drops between the condenser and the evaporator. Flashing cools the refrigerant, i.e., both the liquid refrigerant and the refrigerant vapor to the saturation temperature at evaporator pressure, so that both liquid refrigerant and refrigerant vapor are present in the evaporator.

It should be noted that for a single component refrigerant composition, the composition of the vapor refrigerant in the evaporator is the same as the composition of the liquid refrigerant in the evaporator. In this case, evaporation will occur at a constant temperature. However, if a refrigerant blend (or mixture) is used, as in the present invention, the liquid refrigerant and the refrigerant vapor in the evaporator (or in the condenser) may have different compositions. This may lead to inefficient systems and difficulties in servicing the equipment, thus a single component refrigerant is more desirable. An azeotrope or azeotrope-like composition will function essentially as a single component refrigerant in a chiller, such that the liquid composition and the vapor composition are essentially the same reducing any inefficiencies that might arise from the use of a non-azeotropic or non-azeotrope-like composition.

Chillers with cooling capacities above 700 kW generally employ flooded evaporators, where the refrigerant in the evaporator and the condenser surrounds a coil or tube bundle or other conduit for the heat transfer medium (i.e., the refrigerant is on the shell side). Flooded evaporators require larger charges of refrigerant, but permit closer approach temperatures and higher efficiencies. Chillers with capacities below 700 kW commonly employ evaporators with refrigerant flowing inside the tubes and heat transfer medium in the evaporator and the condenser surrounding the tubes, i.e., the heat transfer medium is on the shell side. Such chillers are called direct-expansion (DX) chillers. One embodiment of a water-cooled direct expansion chiller is illustrated in FIG. 2. In the chiller as illustrated in FIG. 2, first liquid heat transfer medium, which is a warm liquid, such as warm water, enters an evaporator 6' at inlet 14. Mostly liquid refrigerant (with a small amount of refrigerant vapor) enters a coil or tube bundle 9' in the evaporator at arrow 3' and evaporates. As a result, first liquid heat transfer medium is cooled in the evaporator, and a cooled first liquid heat transfer medium exits the evaporator at outlet 16, and is sent to a body to be cooled, such as a building. In this embodiment of FIG. 2, it is this cooled first liquid heat transfer medium that cools the building or other body to be cooled. The refrigerant vapor exits the evaporator at arrow 4' and is sent to a compressor 7', where it is compressed and exits as high temperature, high pressure refrigerant vapor. This refrigerant vapor enters a condenser 5' through a condenser coil 10' or tube bundle at 1'. The refrigerant vapor is cooled by a second liquid heat transfer medium, such as water, in the condenser and becomes a liquid. The second liquid heat transfer medium enters the condenser through a condenser heat transfer medium inlet 20. The second liquid heat transfer medium extracts heat from the condensing refrigerant vapor, which becomes liquid refrigerant, and this warms the second liquid heat transfer medium in the condenser. The second liquid heat transfer medium exits through the condenser heat transfer medium outlet 18. The condensed refrigerant liquid exits the condenser through lower coil 10' as shown in FIG. 2 and flows through an expansion device 12, which may be an orifice, capillary tube or expansion valve. Expansion device 12 reduces the pressure of the liquid refrigerant. A small amount of vapor, produced as a result of the expansion, enters the evaporator with liquid refrigerant through coil 9' and the cycle repeats.

Vapor-compression chillers may be identified by the type of compressor they employ. The present invention includes chillers utilizing centrifugal compressors as well as positive displacement compressors. In one embodiment, the compositions as disclosed herein comprising 2,3,3,3-tetrafluoropropene and 1,1,1,2-tetrafluoroethane are useful in chillers which utilizes a centrifugal compressor, herein referred to as a centrifugal chiller.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its outermost tip and is related to the diameter of the impeller and its revolutions per minute. The capacity of the centrifugal compressor is determined by the size of the passages through the impeller. This makes the size of the compressor more dependent on the pressure required than the capacity.

In another embodiment, the compositions as disclosed herein comprising 2,3,3,3-tetrafluoropropene and 1,1,1,2-tetrafluoroethane are useful in positive displacement chillers, which utilize positive displacement compressors, either reciprocating, screw, or scroll compressors. A chiller which utilizes a screw compressor will be hereinafter referred to as a screw chiller.

Positive displacement compressors draw vapor into a chamber, and the chamber decreases in volume to compress the vapor. After being compressed, the vapor is forced from the chamber by further decreasing the volume of the chamber to zero or nearly zero.

Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (>5000 psi or 35 MPa).

Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (>1200 psi or 8.3 MPa).

Scroll compressors are similar to screw compressors and include two interleaved spiral-shaped scrolls to compress the gas. The output is more pulsed than that of a rotary screw compressor.

For chillers which use scroll compressors or reciprocating compressors, capacities below 150 kW, brazed-plate heat exchangers are commonly used for evaporators instead of the shell-and-tube heat exchangers employed in larger chillers. Brazed-plate heat exchangers reduce system volume and refrigerant charge.

Methods

In one embodiment is provided a method for producing cooling in a chiller comprising (a) evaporating a liquid refrigerant comprising from about 6 to about 70 weight percent 2,3,3,3-tetrafluoropropene and from about 30 to about 94 weight percent 1,1,1,2-tetrafluoroethane in an evaporator having a heat transfer medium passing therethrough thereby producing a vapor refrigerant; and (b) compressing the vapor refrigerant in a compressor, wherein the volumetric cooling capacity of the refrigerant is greater than the individual volumetric cooling capacities of 2,3,3,3-tetrafluoropropene alone and 1,1,1,2-tetrafluoroethane alone. The method for producing cooling provides cooling to an external location wherein the heat transfer medium passes out of the evaporator to a body to be cooled.

Of particular utility in the method for producing cooling are those compositions wherein the weight ratio of 2,3,3,3-tetrafluoropropene to 1,1,1,2-tetrafluoroethane in the liquid refrigerant is essentially the same as the weight ratio of 2,3,3,3-tetrafluoropropene to 1,1,1,2-tetrafluoroethane in the vapor refrigerant. In other words, the particularly useful compositions are those that are azeotropic or azeotrope-like.

In one embodiment, a body to be cooled may be any space, object or fluid that may be cooled. In one embodiment, a body to be cooled may be a room, building, passenger compartment of an automobile, refrigerator, freezer, or supermarket or convenience store display case. Alternatively, in another embodiment, a body to be cooled may be a heat transfer medium or heat transfer fluid.

In one embodiment, the method for producing cooling comprises producing cooling in a flooded evaporator chiller as described above with respect to FIG. 1. In this method, the compositions as disclosed herein comprising 2,3,3,3-tetrafluoropropene and 1,1,1,2-tetrafluoroethane are evaporated to form refrigerant vapor in the vicinity of a first heat transfer medium. The heat transfer medium is a warm liquid, such as water, which is transported into the evaporator via a pipe from a cooling system. The warm liquid is cooled and is passed to a body to be cooled, such as a building. The refrigerant vapor is then condensed in the vicinity of a second heat transfer medium, which is a chilled liquid which is brought in from, for instance, a cooling tower. The second heat transfer medium cools the refrigerant vapor such that it is condensed to form a liquid refrigerant. In this method, a flooded evaporator chiller may also be used to cool hotels, office buildings, hospitals and universities.

In another embodiment, the method for producing cooling comprises producing cooling in a direct expansion chiller as described above with respect to FIG. 2. In this method, the composition as disclosed herein comprising 2,3,3,3-tetrafluoropropene and 1,1,1,2-tetrafluoroethane is passed through an evaporator and evaporates to produce a refrigerant vapor. A first liquid heat transfer medium is cooled by the evaporating refrigerant. The first liquid heat transfer medium is passed out of the evaporator to a body to be cooled. In this method, the direct expansion chiller may also be used to cool hotels, office buildings, hospitals, universities, as well as naval submarines or naval surface vessels.

In either method for producing cooling in either a flooded evaporator chiller or in direct expansion chiller, the chiller includes a centrifugal compressor.

Refrigerants and heat transfer fluids that are in need of replacement, based upon their GWP values published by the Intergovernmental Panel on Climate Change (IPCC), include but are not limited to HFC-134a. Therefore, in accordance with the present invention, there is provided a method for replacing HFC-134a in a chiller. The method for replacing a refrigerant in a chiller designed for using HFC-134a as refrigerant, comprises charging said chiller with a composition comprising a refrigerant consisting essentially of from about 38 to 82 weight percent 2,3,3,3-tetrafluoropropene and from about 62 to 18 weight percent 1,1,1,2-tetrafluoroethane.

In this method of replacing HFC-134a, the compositions disclosed herein comprising 2,3,3,3-tetrafluoropropene and 1,1,1,2-tetrafluoroethane are useful in centrifugal chillers that may have been originally designed and manufactured to operate with HFC-134a.

In replacing HFC-134a with the compositions as disclosed herein in existing equipment, additional advantages may be realized by making adjustments to equipment or operating conditions or both. For example, impeller diameter and impeller speed may be adjusted in a centrifugal chiller where a composition is being used as a replacement working fluid.

Another refrigerant in need of replacement due to ODP (ODP=1) and GWP (GWP=10,890 is CFC-12. HFC-134a was originally used in chillers as a replacement for CFC-12. But CFC-12 may still be in use in certain areas of the world. Therefore, in accordance with the present invention, there is provided a method for replacing CFC-12 in a chiller. The method for replacing a refrigerant in a chiller designed for using CFC-12 as refrigerant, comprises charging said chiller with a composition comprising a refrigerant consisting essentially of from about 6 to about 70 weight percent 2,3,3,3-tetrafluoropropene and from about 30 to about 94 weight percent 1,1,1,2-tetrafluoroethane.

In this method of replacing CFC-12, the compositions as disclosed herein comprising 2,3,3,3-tetrafluoropropene and 1,1,1,2-tetrafluoroethane is useful in chillers that may have been originally designed and manufactured to operate with CFC-12.

In replacing CFC-12 with the compositions as disclosed herein in existing equipment, additional advantages may be realized by making adjustments to equipment or operating conditions or both. For example, impeller diameter and impeller speed may be adjusted in a centrifugal chiller where a composition is being used as a replacement working fluid.

Alternatively, in the methods of replacing HFC-134a or CFC-12, the composition as disclosed herein comprising 2,3,3,3-tetrafluoropropene and 1,1,1,2-tetrafluoroethane may be useful in new equipment, such as a new chiller comprising a flooded evaporator or a new compressor comprising a direct expansion evaporator.

EXAMPLES

The concepts described herein will be further described in the following examples, which do not limit the scope of the invention described in the claims.

Example 1

Thermal Stability and Compatibility with Metals and POE Lubricant

The stability of a mixture of 59 weight percent HFO-1234yf and 41 weight percent HFC-134a in the presence of steel, copper and aluminum was determined according to the sealed tube testing methodology of ANSI/ASHRAE Standard 97-2007. Sealed glass tubes containing steel, copper and aluminum coupons immersed in the mixture were aged for two weeks at 175° C. and compared to similarly prepared and aged sample tubes containing pure HFC-134a. Visual inspection of the tubes indicated no color change, residues or other deterioration of either refrigerant. Moreover, chemical analysis after thermal aging indicated no detectable fluoride or acid generation. At the test conditions, a mixture of 59 weight percent HFO-1234yf and 41 weight percent HFC-134a shows stability similar to that of HFC-134a.

The stability of a mixture of 59 weight percent HFO-1234yf and 41 weight percent HFC-134a in the presence of POE lubricant was also evaluated. Blends containing 50 wt % of the HFO-1234yf/HFC-134a mixture and 50 wt % POE lubricant were aged in sealed tubes with immersed steel, copper and aluminum coupons for two weeks at 175° C. and compared to similarly prepared and aged blends containing HFC-134a. No degradation of either the refrigerant-oil blends or the metal coupons was observed. Chemical analysis after exposure indicated no detectable fluoride or acid generation or significant change in GC analysis as determined by Gas Chromatography-Mass Spectroscopy.

Example 2

Flammability, GWP and ODP of 1234yf/134a Mixture Compared to CFC-12, HFC-134a and HFO-1234yf

TABLE 1

| Property | CFC-12 | HFC-134a | HFO-1234yf | 1234yf/134a (55/45 wt %) | 1234yf/134a (59/41 wt %) |
|---|---|---|---|---|---|
| Flammability Class (ASHRAE Std 34) | 1 (Non-Flammable) | 1 (Non-Flammable) | 2L (Low Flammability) | 1 (Non-Flammable) | 1 (Non-Flammable) |
| ODP | 1.00 | 0.00 | 0.00 | 0.00 | 0.00 |
| $GWP_{100}$ (100 yr time horizon) | 10,890 | 1430 | 4 | 644 | 589 |
| Chiller Evaporator or Condenser Glide [° C.] | N/A | N/A | N/A | No greater than 0.01 | No greater than 0.01 |

Table 1 shows that non-flammable mixtures of HFO-1234yf and HFC-134a can be formulated with substantially lower GWPs than either CFC-12 or HFC-134a and negligible glide in both typical chiller evaporators and condensers.

Example 3

Thermodynamic Cycle Performance

The performance of a mixture of 59 wt % HFO-1234yf and 41 wt % HFC-134a and pure HFO-1234yf relative to pure HFC-134a in a cooling cycle typical of chiller operation was estimated. Key state variables and performance metrics relative to the currently and previously used mid-pressure chiller refrigerants, namely HFC-134a and CFC-12, are summarized in Table 2. The relative performance was determined at the following conditions:

| | |
|---|---|
| Evaporator temperature | 4.4° C. |
| Condenser temperature | 37.8° C. |
| Vapor Superheat at Compressor Inlet: | 0° C. |
| Liquid Subcooling at Condenser Outlet: | 0° C. |
| Compressor efficiency | 70% |

TABLE 2

| | 1234yf/134a (59/41 wt %) vs HFC-134a % | 1234yf/134a (59/41 wt %) vs CFC-12 % | HFO-1234yf vs HFC-134a % | HFC-134a vs CFC-12 % | HFO-1234yf vs CFC-12 % |
|---|---|---|---|---|---|
| Compression Ratio | −3.5 | 5.6 | −5.8 | 9.5 | 3.2 |
| Compressor Enthalpy Rise | −11.7 | 14.4 | −19.1 | 29.5 | 4.8 |
| Compressor Impeller Tip Speed | −6.0 | 7.0 | −10.1 | 13.8 | 2.4 |
| Compressor Discharge Temperature | −9.8 | −13.8 | −15.9 | −4.5 | −19.7 |
| Net Refrigeration Effect per Unit Mass of Refrigerant | −13.9 | 9.7 | −22.8 | 27.4 | −1.6 |
| Vapor Density at Compressor Suction | 17.8 | −4.7 | 21.2 | −19.1 | −2.0 |
| Cooling Capacity Per Unit Volume of Refrigerant | 1.5 | 4.6 | −6.5 | 3.1 | −3.6 |
| Coefficient of Performance for Cooling | −2.5 | −4.1 | −4.5 | −1.7 | −6.1 |
| Compressor Impeller Diameter | 2.4 | −5.4 | 9.0 | −7.7 | 0.7 |

The compression work (i.e. isentropic compression enthalpy rise) required to lift a unit mass of the 1234yf/134a mixture from evaporator to condenser conditions is estimated to be 11.7% lower than HFC-134a.

If a centrifugal compressor were used, a 6% lower impeller tip speed would suffice for the 1234yf/134a mixture relative to HFC-134a. The compressor discharge temperature would be 9.8% lower with the 1234yf/134a mixture relative to HFC-134a alone. The net refrigeration effect across the evaporator per unit mass of the 1234yf/134a mixture would be 13.9% lower than HFC-134a alone. However, the 1234yf/134a mixture vapor density at compressor suction conditions is 17.8% higher than HFC-134a alone. The higher vapor density compensates for its lower net refrigeration effect and results in a 1.5% higher volumetric cooling capacity for the 1234yf/134a mixture compared with HFC-134a alone. Use of the 1234yf/134a mixture leads to a higher COP than using HFO-1234yf alone, because the mixture delivers an 11.6% larger refrigeration effect than HFO-1234yf alone. The volumetric cooling capacity of the 1234yf/134a mixture is 8.5% higher than pure HFO-1234yf alone.

The results in Table 2 suggest that large tonnage chillers using the 1234yf/134a mixture could be designed with performance comparable to that of currently used HFC-134a chillers. Replacing HFC-134a with the 1234yf/134a mixture in existing chillers is also feasible.

Table 2 shows the relative values of the calculated impeller diameters. The impeller required for the 1234yf/134a mixture would be 2.4% larger than for HFC-134a alone. For comparison, pure HFO-1234yf would require an impeller diameter 9% larger than HFC-134a alone.

Example 4

Thermodynamic Cycle Performance

Table 3 shows the cooling performance of various refrigerant compositions as disclosed herein as compared to HFC-134a and HFO-1234yf. In the table, Evap Pres is evaporator pressure, Cond Pres is condenser pressure, Comp Exit T is compressor exit temperature, COP is coefficient of performance (analogous to energy efficiency), and Cap is volumetric cooling capacity. The data are estimated based on the following conditions:

| | |
|---|---|
| Evaporator temperature | 4.4° C. |
| Condenser temperature | 37.8° C. |
| Vapor Superheat at Compressor Inlet: | 0° C. |
| Liquid Subcooling at Condenser Outlet: | 0° C. |
| Compressor efficiency | 70% |

TABLE 3

| Composition | 134a | 1234yf | 1234yf/134a (20/80 wt %) | 1234yf/134a (40/60 wt %) | 1234yf/134a (55/45 wt %) | 1234yf/134a (60/40 wt %) | 1234yf/134a (80/20 wt %) |
|---|---|---|---|---|---|---|---|
| GWP | 1430 | 4 | 1041 | 782 | 644 | 522 | 263 |
| Condenser Pressure (kPa) | 958 | 960 | 988 | 1007 | 1008 | 1009 | 994 |
| Discharge Temp (° C.) | 50.3 | 42.3 | 48.7 | 47.0 | 45.8 | 45.4 | 43.8 |
| Evap P (kPa) | 343 | 364 | 358 | 369 | 374 | 375 | 373 |
| Cond. Glide (° C.) | 0.00 | 0.00 | 0.08 | 0.02 | 0.01 | 0.01 | 0.07 |
| Evap. Glide (° C.) | 0.00 | 0.00 | 0.12 | 0.07 | 0.01 | 0.00 | 0.01 |
| Volumetric Cooling Capacity [kJ/m3] | 2482 | 2322 | 2531 | 2545 | 2532 | 2517 | 2442 |
| COP | 4.846 | 4.626 | 4.808 | 4.766 | 4.734 | 4.723 | 4.677 |
| Capacity Relative to 134a | 1.000 | 0.936 | 1.020 | 1.025 | 1.018 | 1.014 | 0.984 |
| COP Relative to 134a | 1.000 | 0.955 | 0.992 | 0.983 | 0.977 | 0.975 | 0.965 |
| Tip Speed (m/s) | 176.4 | 158.7 | 172.9 | 169 | 166.5 | 165.6 | 162.1 |
| Tip Speed Relative to 134a | 1.000 | 0.899 | 0.980 | 0.960 | 0.944 | 0.939 | 0.919 |

Figure 3:
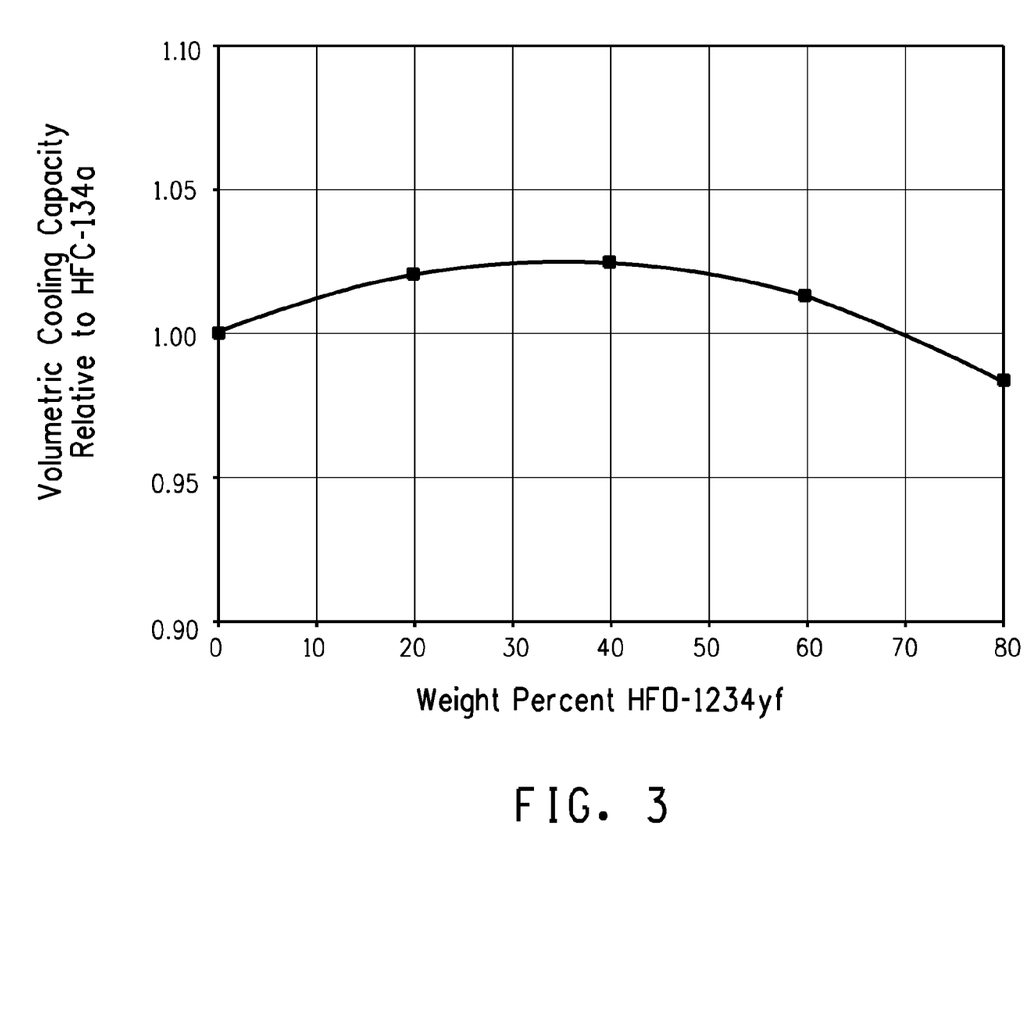
FIG. 3 is a plot of volumetric cooling capacity for various compositions containing HFO-1234yf and HFC-134a relative to the volumetric cooling capacity of HFC-134a alone versus the weight percent HFO-1234yf in the compositions.

The data in Table 3 demonstrate the particularly close match of the present compositions for HFC-134a. FIG. 3 shows the volumetric cooling capacity of 1234yf/134a mixtures relative to the volumetric cooling capacity for pure HFC-134a plotted versus weight percent HFO-1234yf. FIG. 3 shows that 1234yf/134a compositions with just above zero to about 70 weight percent HFO-1234yf have volumetric cooling capacity values higher than that of HFC-134a alone, despite the fact that HFO-1234yf alone has a lower volumetric cooling capacity than HFC-134a alone. Additionally for centrifugal systems, the tip speeds for the 1234yf/134a mixtures listed in the table provide a closer match to pure HFC-134a than HFO-1234yf alone can provide.

Example 5

Miscibility with Lubricants

The miscibility of mixture of 59 wt % HFO-1234yf and 41 wt % HFC-134a with three commercially available chiller POE lubricants (York H, York K and York L, supplied by Johnson Controls) was tested over a wide range of concentrations and temperatures that covers the operating ranges typically encountered in chillers. Sealed glass tubes containing the 1234yf/134a mixture and lubricant in various proportions were prepared and immersed sequentially first in a cold and then in a warm agitated constant temperature bath controlled at the targeted temperature levels. The miscibility characteristics of each 1234yf/134a/lubricant blend were visually observed and recorded, after temperature equilibration, at temperature increments of 5° C. Blends with a homogeneous, translucent solution appearance were qualified as "miscible" at the observation temperature. Blends separating into distinct phases divided by a meniscus or exhibiting turbidity (i.e. cloudiness or haziness) indicative of the formation of individual particles were designated as "non-miscible". Mixtures of 1234yf/134a with 5 to 70 wt % of the selected POE lubricants were completely miscible over the temperature range representative of chiller operation.

Example 6

Thermodynamic Cycle Performance

The performance of a mixture of 55 wt % HFO-1234yf and 45 wt % HFC-134a and relative to HFC-134a alone and CFC-12 along in a cooling cycle typical of chiller operation was estimated as in Example 3 above for the 59/41 wt % mixture. Key state variables and performance metrics relative to the currently and previously used mid-pressure chiller refrigerants, namely HFC-134a and CFC-12, are summarized in Table 4. The relative performance was determined at the following conditions:

| Evaporator temperature | 4.4° C. |
|---|---|
| Condenser temperature | 37.8° C. |
| Vapor Superheat at Compressor Inlet: | 0° C. |
| Liquid Subcooling at Condenser Outlet: | 0° C. |
| Compressor efficiency | 70% |

TABLE 4

| | 1234yf/134a (55/45 wt %) vs HFC-134a % | 1234yf/134a (55/45 wt %) vs CFC-12 % |
|---|---|---|
| Compression Ratio | −3.5 | 5.7 |
| Compressor Enthalpy Rise | −11.1 | 15.2 |
| Compressor Impeller Tip Speed | −5.7 | 7.3 |
| Compressor Discharge Temperature | −9.2 | −13.3 |
| Net Refrigeration Effect per Unit Mass of Refrigerant | −12.9 | 10.9 |
| Vapor Density at Compressor Suction | 17.1 | −5.2 |

What is claimed is:

1. A chiller apparatus containing a composition comprising from about 38 to about 67 weight percent 2,3,3,3-tetrafluoropropene and from about 62 to about 33 weight percent 1,1,1,2-tetrafluoroethane, wherein the chiller apparatus is a centrifugal chiller.

2. The chiller apparatus of claim 1 suitable for use with HFC-134a.

3. The chiller apparatus of claim 1 suitable for use with CFC-12.

4. The chiller apparatus of claim 1, wherein said composition comprises from about 54 to about 67 weight percent 2,3,3,3-tetrafluoropropene and from about 46 to about 33 weight percent 1,1,1,2-tetrafluoroethane.

5. The chiller apparatus of claim 1, wherein said composition comprises from about 54.0 to about 56.0 weight percent 2,3,3,3-tetrafluoropropene and from about 46.0 to about 44.0 weight percent 1,1,1,2-tetrafluoroethane.

6. The chiller apparatus of claim 5, wherein said composition comprises about 55 weight percent 2,3,3,3-tetrafluoropropene and about 45 weight percent 1,1,1,2-tetrafluoroethane.

7. The chiller apparatus of claim 1, wherein said composition comprises from about 58.0 to about 59.5 weight percent 2,3,3,3-tetrafluoropropene and from about 42.0 to about 40.5 weight percent 1,1,1,2-tetrafluoroethane.

8. The chiller apparatus of claim 7, wherein said composition comprises about 59 weight percent 2,3,3,3-tetrafluoropropene and about 41 weight percent 1,1,1,2-tetrafluoroethane.

9. A method for producing cooling in a chiller comprising (a) evaporating a liquid refrigerant comprising from about 38 to 67 weight percent 2,3,3,3-tetrafluoropropene and from about 62 to 33 weight percent 1,1,1,2-tetrafluoroethane in an evaporator having a heat transfer medium passing therethrough thereby producing a vapor refrigerant; and (b) compressing the vapor refrigerant in a compressor, wherein the volumetric cooling capacity of the refrigerant is greater than the individual volumetric cooling capacities of 2,3,3,3-tetrafluoropropene alone and 1,1,1,2-tetrafluoroethane alone, wherein the chiller apparatus is a centrifugal chiller.

10. The method of claim 9, wherein the weight ratio of 2,3,3,3-tetrafluoropropene to 1,1,1,2-tetrafluoroethane in the liquid refrigerant is essentially the same as the weight ratio of 2,3,3,3-tetrafluoropropene to 1,1,1,2-tetrafluoroethane in the vapor refrigerant.

11. The method of claim 9, wherein the heat transfer medium passes out of the evaporator to a body to be cooled.

12. A method for replacing a refrigerant in a chiller designed for using HFC-134a or CFC-12 as refrigerant, comprising charging said chiller with a composition comprising a refrigerant consisting essentially of from about 38 to 67 weight percent 2,3,3,3-tetrafluoropropene and from about 62 to 33 weight percent 1,1,1,2-tetrafluoroethane thereby increasing the cooling capacity of the chiller, wherein the chiller apparatus is a centrifugal chiller.

13. The chiller apparatus of claim 1, wherein said composition consists of 2,3,3,3-tetrafluoropropene and 1,1,1,2-tetrafluoroethane.

14. A chiller apparatus containing a composition comprising from about 20 to about 60 weight percent 2,3,3,3-tetrafluoropropene and from about 80 to about 40 weight percent 1,1,1,2-tetrafluoroethane, wherein the chiller apparatus is a centrifugal chiller.

15. The chiller apparatus of claim 14, wherein said composition consists of 2,3,3,3-tetrafluoropropene and 1,1,1,2-tetrafluoroethane.

* * * * *